US012482591B2

(12) United States Patent
Saito et al.

(10) Patent No.: US 12,482,591 B2
(45) Date of Patent: Nov. 25, 2025

(54) COIL COMPONENT

(71) Applicant: TDK CORPORATION, Tokyo (JP)

(72) Inventors: Masataro Saito, Tokyo (JP); Masazumi Arata, Tokyo (JP); Hokuto Eda, Tokyo (JP); Kohei Takahashi, Tokyo (JP); Takamasa Iwasaki, Tokyo (JP)

(73) Assignee: TDK CORPORATION, Tokyo (JP)

(*) Notice: Subject to any disclaimer, the term of this patent is extended or adjusted under 35 U.S.C. 154(b) by 219 days.

(21) Appl. No.: 17/126,323

(22) Filed: Dec. 18, 2020

(65) Prior Publication Data

US 2021/0193369 A1 Jun. 24, 2021

(30) Foreign Application Priority Data

Dec. 24, 2019 (JP) ................................ 2019-233233

(51) Int. Cl.
*H01F 27/32* (2006.01)
*H01F 27/255* (2006.01)
*H01F 27/28* (2006.01)
*H01F 27/29* (2006.01)

(52) U.S. Cl.
CPC ....... *H01F 27/2804* (2013.01); *H01F 27/255* (2013.01); *H01F 27/32* (2013.01); *H01F 27/29* (2013.01)

(58) Field of Classification Search
CPC .... H01F 27/255; H01F 27/2804; H01F 27/29; H01F 27/32
See application file for complete search history.

(56) References Cited

U.S. PATENT DOCUMENTS 10,453,602 B2 * 10/2019 Yoshioka ............ H01F 27/2823
2005/0007232 A1 1/2005 Ono et al.
2005/0012581 A1 * 1/2005 Ono .................... H01F 1/15366 336/90
2009/0295526 A1 12/2009 Mikami et al.
2014/0220364 A1 8/2014 Umemoto et al.
2015/0002256 A1 * 1/2015 Bourns ............... H01F 17/0013 336/200
2016/0379750 A1 * 12/2016 Hamada .............. H01F 17/0013 336/220

(Continued)

FOREIGN PATENT DOCUMENTS

CN 1574122 A 2/2005
JP 2002270451 A 9/2002

(Continued)

OTHER PUBLICATIONS

Britannica, Insulator.*
Aug. 14, 2023 Office Action issued in Japanese Patent Application No. 2019-233233.

*Primary Examiner* — Holly Rickman
*Assistant Examiner* — Linda N Chau
(74) *Attorney, Agent, or Firm* — Oliff PLC

(57) ABSTRACT

In a coil component, a non-magnetic part is bridged between a first coil and a second coil in a cross section of an element body. Therefore, a magnetic flux in a direction along a magnetic core of the first coil and a magnetic core of the second coil is hindered by the non-magnetic part between the first coil and the second coil. Accordingly, a magnetic flux of the first coil and a magnetic flux of the second coil are difficult to interfere with each other.

7 Claims, 10 Drawing Sheets

(56) References Cited

U.S. PATENT DOCUMENTS

| | | | |
|---|---|---|---|
| 2017/0133145 | A1 | 5/2017 | Hong et al. |
| 2017/0196091 | A1 | 7/2017 | Lee |
| 2018/0075965 | A1 | 3/2018 | Yoshioka et al. |
| 2019/0115150 | A1 | 4/2019 | Yoshioka et al. |
| 2020/0013544 | A1 | 1/2020 | Yoshioka et al. |
| 2020/0211767 | A1* | 7/2020 | Hou ...................... H01F 27/255 |
| 2020/0373079 | A1 | 11/2020 | Yoshioka et al. |
| 2021/0134515 | A1* | 5/2021 | Jung .................. H01F 27/2852 |
| 2023/0260696 | A1 | 8/2023 | Yoshioka et al. |

FOREIGN PATENT DOCUMENTS

| | | | |
|---|---|---|---|
| JP | 2010135602 | A | 6/2010 |
| JP | 2014152059 | A | 8/2014 |
| JP | 2017-92444 | A | 5/2017 |
| JP | 2018-46051 | A | 3/2018 |
| JP | 2019075478 | A | 5/2019 |
| WO | 2007111122 | A1 | 10/2007 |

* cited by examiner

COIL COMPONENT

CROSS-REFERENCE TO RELATED APPLICATIONS

This application is based upon and claims the benefit of priority from Japanese Patent Application No. 2019-233233, filed on 24 Dec. 2019, the entire contents of which are incorporated herein by reference.

TECHNICAL FIELD

The present disclosure relates to a coil component.

BACKGROUND

The specification of Unites States Patent Application, Publication No. 2017-196091 (Patent Document 1) discloses a coil component which includes two coils aligned in an element body and a non-magnetic layer disposed between the two coils. This document demonstrates that mutual interference between the magnetic fluxes of the two coils is suppressed by the non-magnetic layer.

SUMMARY

In the coil component according to the above-described conventional technology, mutual interference of magnetic fluxes cannot be sufficiently suppressed, and further suppression of the mutual interference of the magnetic fluxes is required.

According to the present disclosure, a coil component capable of further suppressing mutual interference of magnetic fluxes is provided.

A coil component according to one aspect of the present disclosure includes an element body, a first coil provided in the element body and wound around a first magnetic core, a second coil provided in the element body, wound around a second magnetic core extending in a direction along the first magnetic core, and adjacent to the first coil in a direction perpendicular to the first magnetic core, and a non-magnetic part bridged between the first coil and the second coil in a cross section including the magnetic core of the first coil and the magnetic core of the second coil of the element body.

In the above-described coil component, the non-magnetic part is bridged between the first coil and the second coil in a cross section including the magnetic core of the first coil and the magnetic core of the second coil of the element body. Therefore, a magnetic flux in a direction along the first magnetic core is hindered by the non-magnetic part between the first coil and the second coil. Therefore, a magnetic flux of the first coil and a magnetic flux of the second coil are difficult to interfere with each other.

In the coil component according to another aspect, the first coil and the second coil may be formed in a first layer of the element body.

In the coil component according to another aspect, the non-magnetic part may include a first portion positioned in the first layer.

The coil component according to another aspect may further include a resin part extending between the first coil and the second coil in the first layer. The resin part may constitute the first portion of the non-magnetic part.

In the coil component according to another aspect, the non-magnetic part may include a second portion positioned in a second layer. The second layer overlaps the first layer of the element body.

The coil component according to another aspect may further include an insulating substrate provided in the element body, formed of a non-magnetic insulating material, and including a main surface. The first coil and the second coil are formed on the main surface. The insulating substrate may constitute at least a part of the second portion of the non-magnetic part.

In the coil component according to another aspect, at least one of the first coil and the second coil may include a first coil pattern provided on one main surface of the insulating substrate and a second coil pattern provided on the other main surface.

The coil component according to another aspect may further include a protective film covering the insulating substrate along with the first coil and the second coil integrally. The protective film may constitute at least a part of the second portion of the non-magnetic part.

DETAILED DESCRIPTION

Hereinafter, embodiments of the present disclosure will be described in detail with reference to the accompanying drawings. In the description, the same elements or elements having the same function will be denoted by the same reference signs and duplicate descriptions thereof will be omitted.

Figure 1:
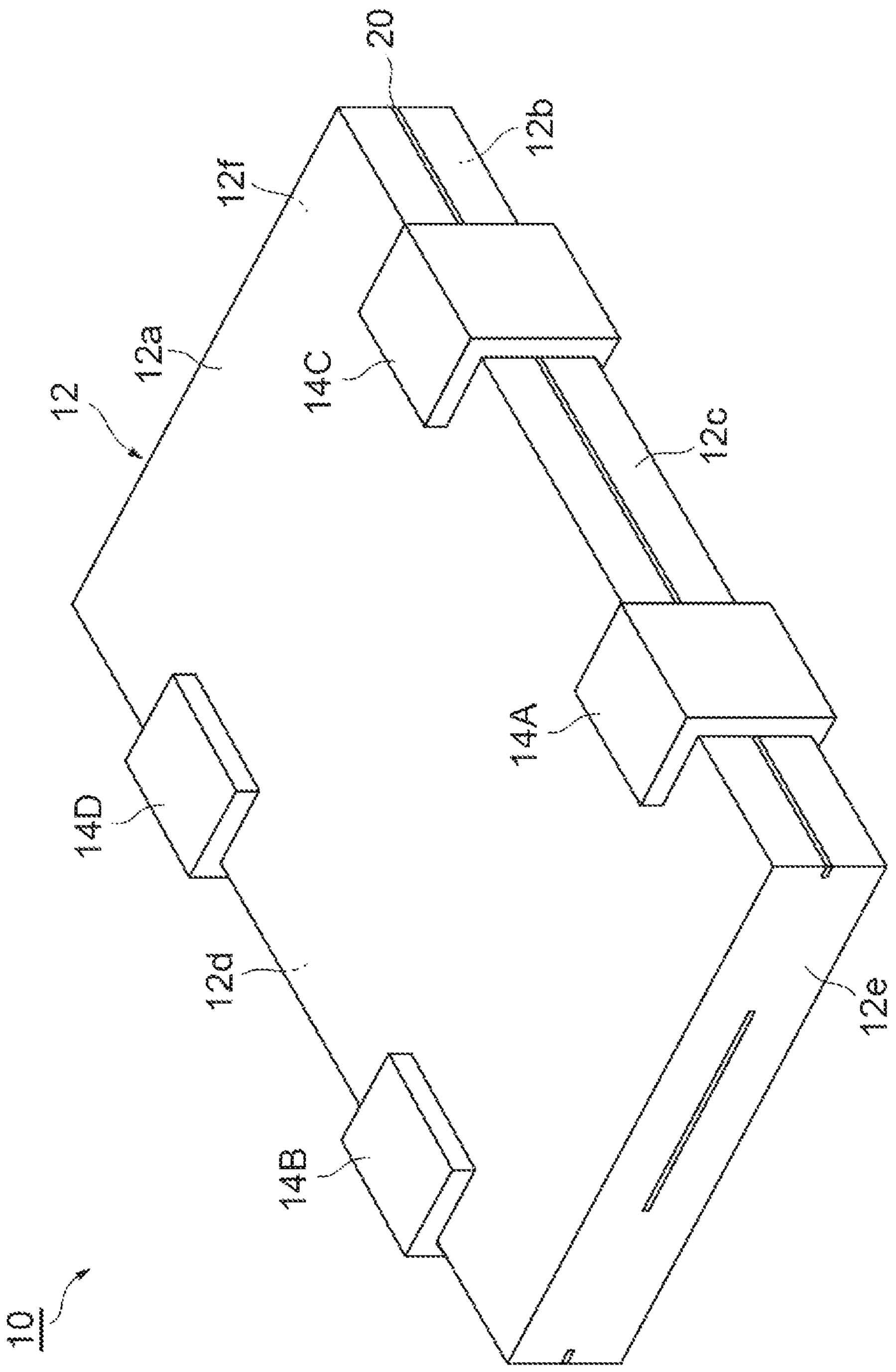
FIG. 1 is a schematic perspective view of a coil component according to an embodiment.
Figure 2:
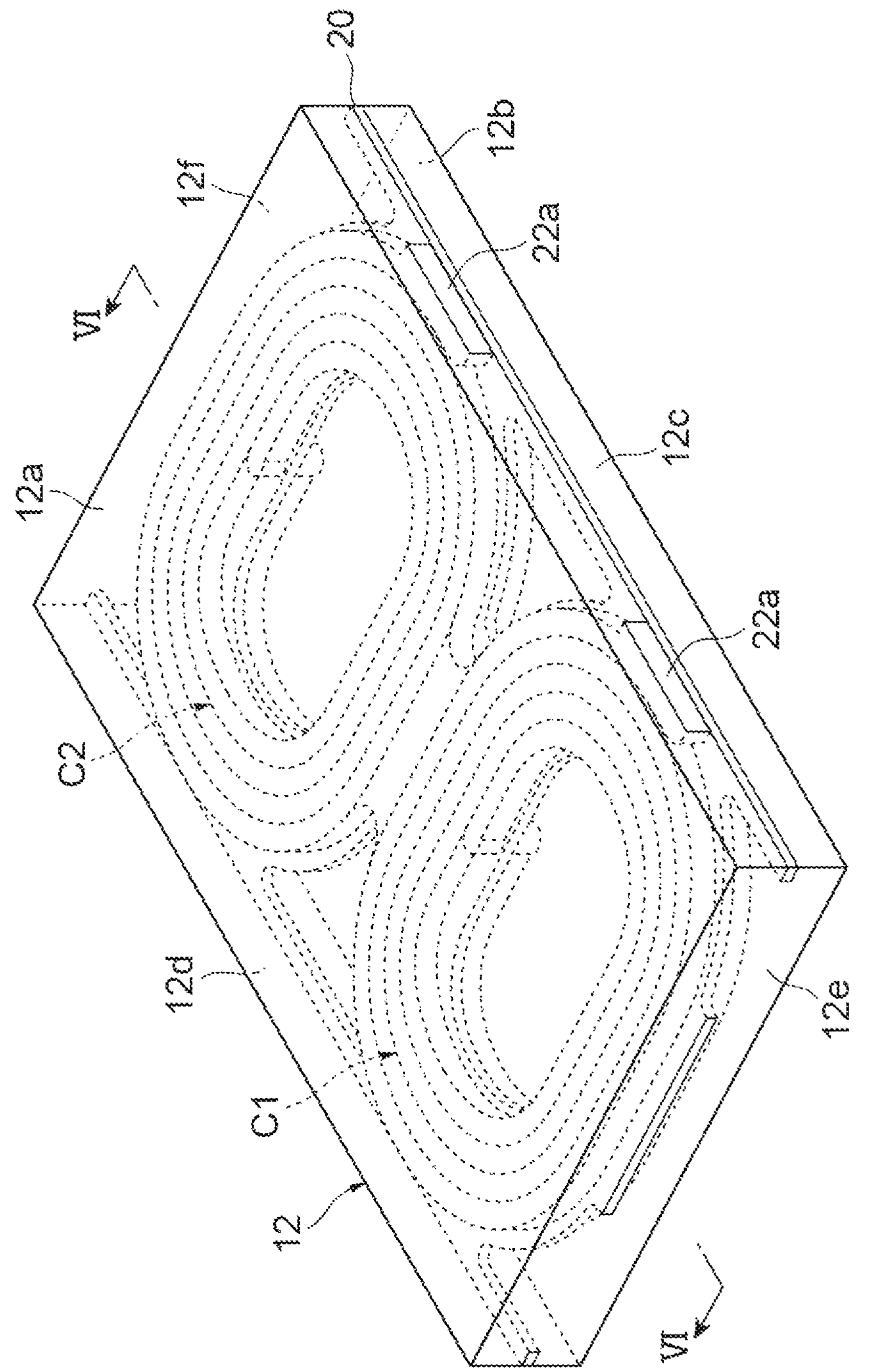
FIG. 2 is a view illustrating a main body part of the coil component illustrated in FIG. 1.
Figure 3:
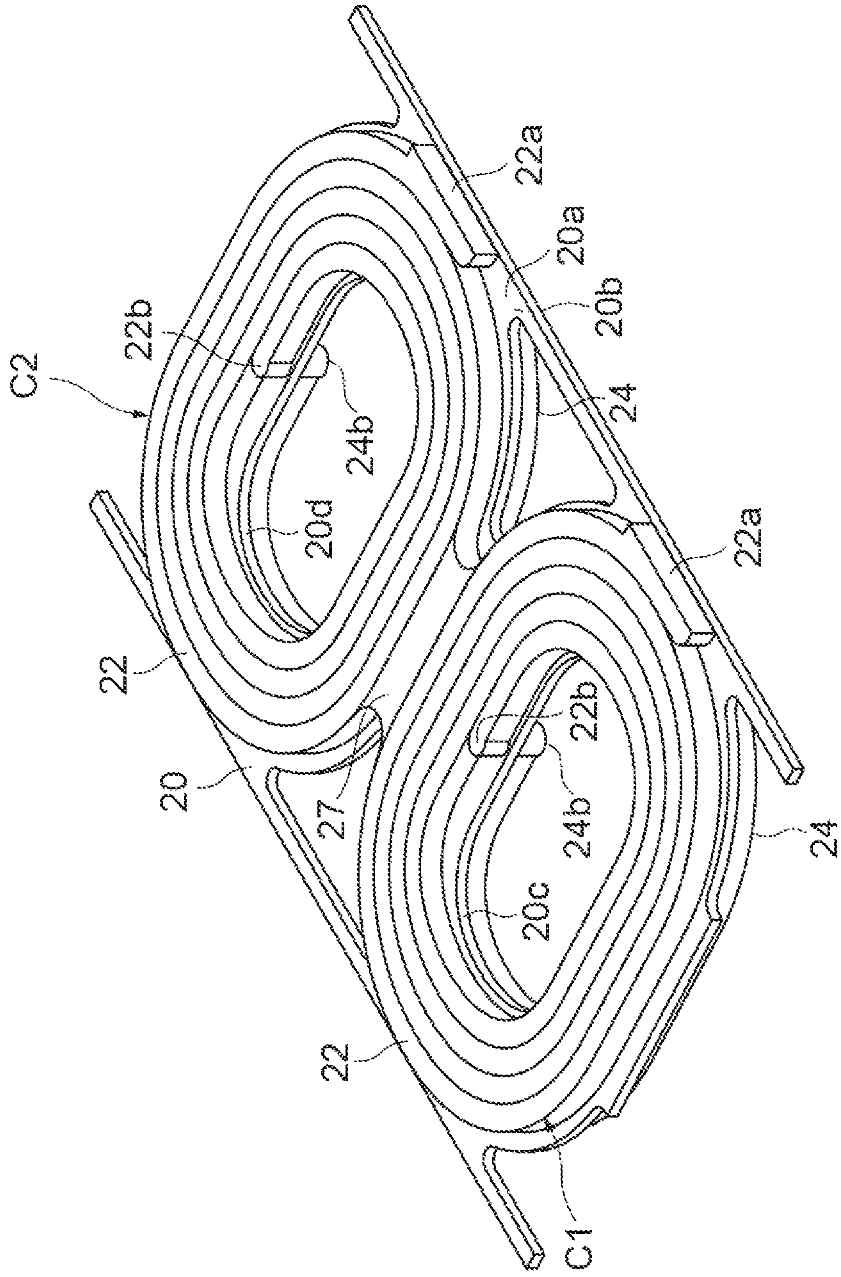
FIG. 3 is a view illustrating an internal structure of the main body part illustrated in FIG. 2.

A coil component 10 according to an embodiment will be described with reference to FIGS. 1 to 3.

The coil component 10 is configured to include a main body part 12 (element body) having a rectangular flat plate-like outer shape, and two pairs of external terminal electrodes 14A, 14B, 14C, and 14D provided on surfaces of the main body part 12. The main body part 12 includes a rectangular upper surface 12*a* and a rectangular lower surface 12*b* parallel to each other, a pair of side surfaces 12*c* and 12*d* perpendicular to the upper surface 12*a* and the lower surface 12*b*, and a pair of end surfaces 12*e* and 12*f* perpendicular to the pair of main surfaces 12*a* and 12*b* and the pair of side surfaces 12*c* and 12*d*. The external terminal electrodes 14A, 14B, 14C, and 14D are formed on the side surfaces 12*c* and 12*d* in pairs. As an example, the main body part 12 is designed with dimensions such that a long side length of the upper surface 12*a* is 3.2 mm, a short side length of the upper surface is 2.0 mm, and a height is 0.5 mm.

The main body part 12 is configured to include an insulating substrate 20, a first coil C1 and a second coil C2 provided on the insulating substrate 20, and a magnetic material 30.

The insulating substrate 20 is a plate-shaped member provided inside the main body part 12 and is formed of a non-magnetic insulating material. As the insulating substrate 20, a substrate in which a glass cloth is impregnated with an epoxy-based resin and having a plate thickness of 10 μm to 60 μm can be used. Further, a BT resin, polyimide, aramid, or the like can also be used in addition to an epoxy-based resin. As a material of the insulating substrate 20, a ceramic or glass can also be used. A material of the insulating substrate 20 may be a mass-produced printed circuit board material and may be a resin material particularly used for a BT printed circuit board, an FR4 printed circuit board, or an FR5 printed circuit board.

A plurality of through holes including a first through hole 20*c* and a second through hole 20*d* are provided in the insulating substrate 20. The first through hole 20*c* and the second through hole 20*d* both have an elliptical shape and are aligned in a direction in which the pair of end surfaces 12*e* and 12*f* face each other.

Figure 4:
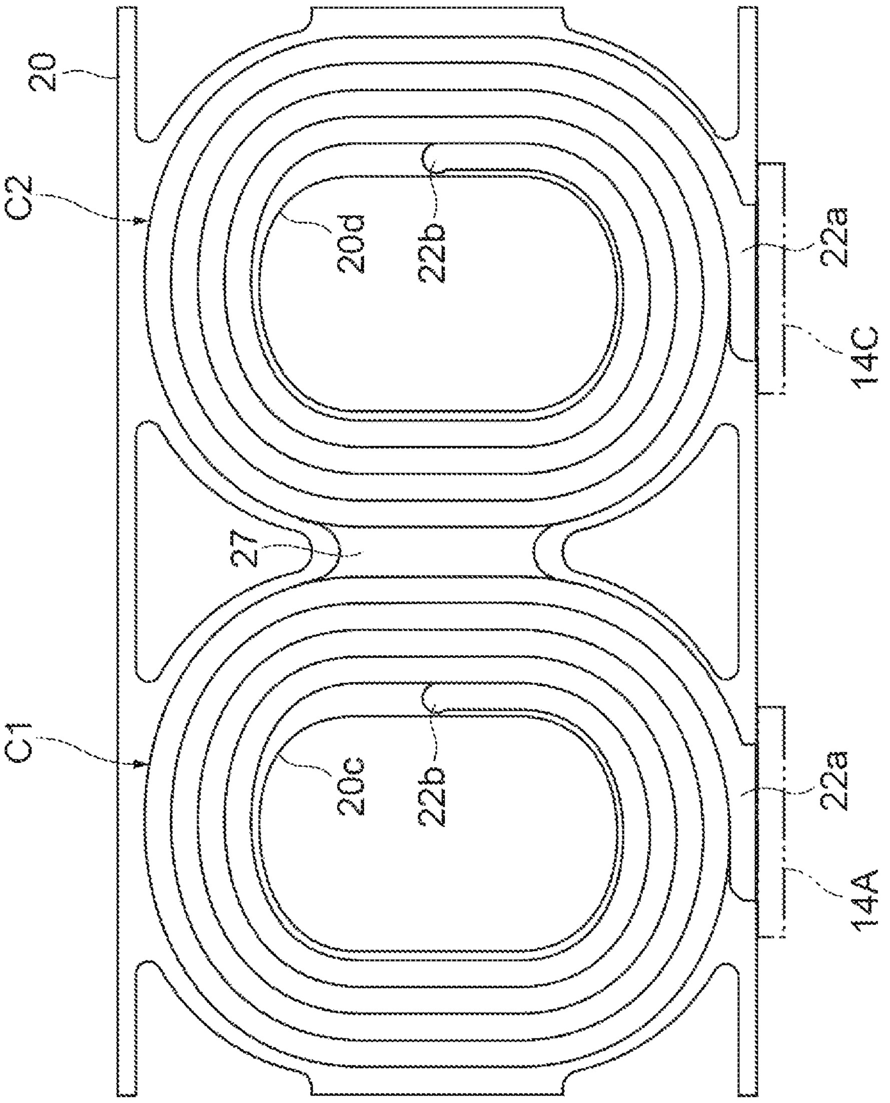
FIG. 4 is a view illustrating a first planar coil pattern provided on an upper surface of a substrate.
Figure 5:
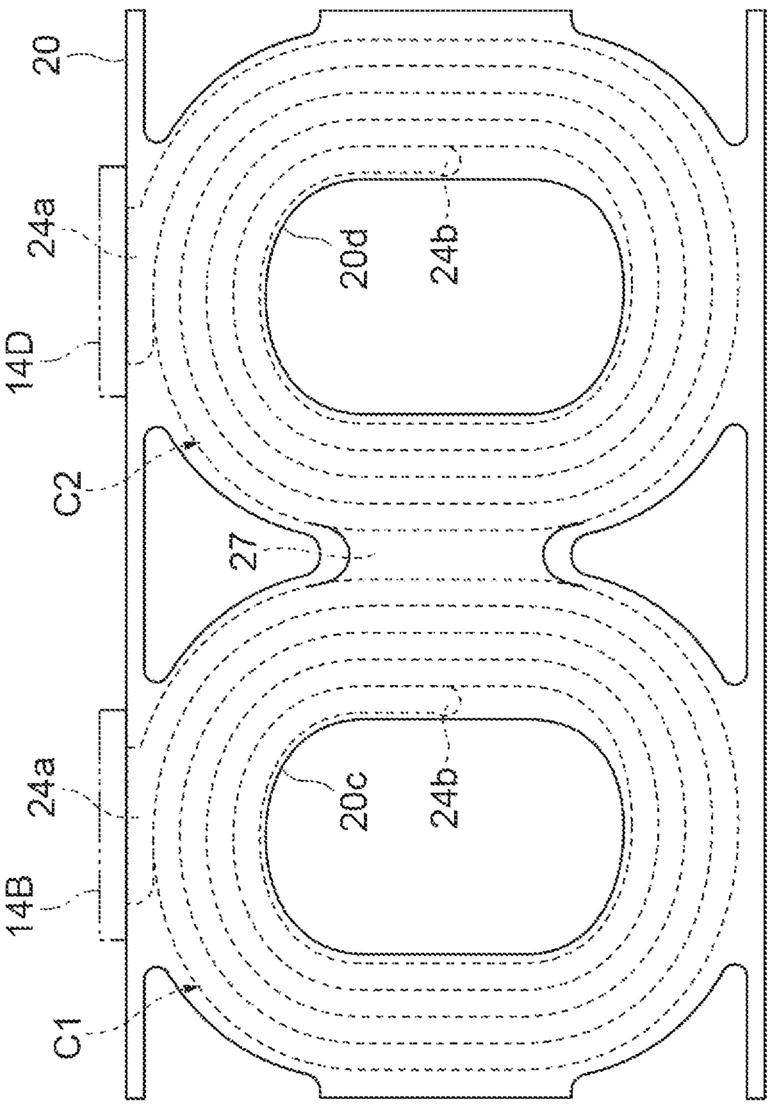
FIG. 5 is a view illustrating a second planar coil pattern provided on a lower surface of the substrate.

As illustrated in FIGS. 4 and 5, the first coil C1 is configured to include planar coil patterns 22 and 24 wound around the first through hole 20*c* of the insulating substrate 20. The planar coil patterns 22 and 24 of the first coil C1 are constituted by a first planar coil pattern 22 formed on an upper surface 20*a* of the insulating substrate 20 and a second planar coil pattern 24 formed on a lower surface 20*b* of the insulating substrate 20.

As illustrated in FIG. 4, the first planar coil pattern 22 is wound around the first through hole 20*c* a plurality of times (about 4 turns in the present embodiment) in a planar spiral shape. The first planar coil pattern 22 has an outer end portion 22*a* that reaches the side surface 12*c* of the main body part 12 to be exposed. The external terminal electrode 14A is formed in a region of the side surface 12*c* at which the outer end portion 22*a* of the first planar coil pattern 22 is exposed, and the outer end portion 22*a* of the first planar coil pattern 22 is connected to the external terminal electrode 14A on the side surface 12*c*. Also, the first planar coil pattern 22 has an inner end portion 22*b* positioned in an edge region of the first through hole 20*c*. The first planar coil pattern 22 is connected to the second planar coil pattern 24 at the inner end portion 22*b* via a first through conductor V1 to be described below.

As illustrated in FIG. 5, the second planar coil pattern 24 has a symmetrical shape with respect to the first planar coil pattern 22 when viewed from the upper surface 20*a* side of the insulating substrate 20. More specifically, the first planar coil pattern 22 and the second planar coil pattern 24 have a line-symmetrical relationship. Therefore, similarly to the first planar coil pattern 22, the second planar coil pattern 24 is wound around the first through hole 20*c* a plurality of times (about 4 turns in the present embodiment) in a planar spiral shape. The second planar coil pattern 24 has an outer end portion 24*a* that reaches the side surface 12*d* of the main body part 12 to be exposed. The external terminal electrode 14B is formed in a region of the side surface 12*d* at which the outer end portion 24*a* of the second planar coil pattern 24 is exposed, and the outer end portion 24*a* of the second planar coil pattern 24 is connected to the external terminal electrode 14B on the side surface 12*d*. Also, the second planar coil pattern 24 has an inner end portion 24*b* at a position overlapping the inner end portion 22*b* of the first planar coil pattern 22.

The first coil C1 includes the first through conductor V1 that connects the inner end portion 22*b* of the first planar coil pattern 22 to the inner end portion 24*b* of the second planar coil pattern 24. The first through conductor V1 penetrates the insulating substrate 20 in a thickness direction, is in contact with the inner end portion 22*b* of the first planar coil pattern 22 at an upper end thereof, and is in contact with the inner end portion 24*b* of the second planar coil pattern 24 at a lower end thereof.

When a voltage is applied between the external terminal electrodes 14A and 14B, a current flows through the first planar coil pattern 22 and the second planar coil pattern 24 connected by the first through conductor V1 in the same circumferential direction (for example, clockwise direction) when viewed from the upper surface 20*a* side of the insulating substrate 20. Therefore, in the first coil C1, the first planar coil pattern 22 and the second planar coil pattern 24 cooperate to function as one coil.

As illustrated in FIGS. 4 and 5, the second coil C2 is configured to include planar coil patterns 22 and 24 wound around the second through hole 20*d* of the insulating substrate 20. The second coil C2 is aligned with the first coil C1 in a direction in which the pair of end surfaces 12*e* and 12*f* face each other. As in the planar coil patterns 22 and 24 of the first coil C1, the planar coil patterns 22 and 24 of the second coil C2 are constituted by a first planar coil pattern 22 formed on the upper surface 20*a* of the insulating substrate 20 and a second planar coil pattern 24 formed on the lower surface 20*b* of the insulating substrate 20.

The first planar coil pattern 22 of the second coil C2 has the same shape as the first planar coil pattern 22 of the first coil C1. Regarding the second coil C2, the external terminal electrode 14C is formed in a region of the side surface 12*c* at which an outer end portion 22*a* of the first planar coil pattern 22 is exposed, and the outer end portion 22*a* of the first planar coil pattern 22 is connected to the external terminal electrode 14C on the side surface 12*c*. Also, the external terminal electrode 14D is formed in a region of the side surface 12*d* at which an outer end portion 24*a* of the second planar coil pattern 24 is exposed, and the outer end portion 24*a* of the second planar coil pattern 24 is connected to the external terminal electrode 14D on the side surface 12*d*. Further, an inner end portion 22*b* of the first planar coil pattern 22 and an inner end portion 24*b* of the second planar coil pattern 24 positioned at positions overlapping each other in an edge region of the second through hole 20*d* are connected via a second through conductor V2 similarly to the first through conductor V1.

In the second coil C2, similarly to the first coil C1, when a voltage is applied between the external terminal electrodes 14C and 14D, the first planar coil pattern 22 and the second planar coil pattern 24 cooperate to function as one coil.

The first planar coil pattern 22 and the second planar coil pattern 24 can be formed using plating.

In the first coil C1 and the second coil C2, a side surface of the first planar coil pattern 22 (that is, a surface perpendicular to the insulating substrate 20) is covered with a resin wall 25, a side surface of the second planar coil pattern 24 is covered with a resin wall 26, and the resin walls 25 and 26 are formed of an insulating resin material. The resin walls 25 and 26 can be provided on the insulating substrate 20 before the first planar coil pattern 22 and the second planar coil pattern 24 are formed, and in this case, the first planar coil pattern 22 and the second planar coil pattern 24 are plated and grown in a space between walls defined by the resin walls 25 and 26. That is, formation regions of the first planar coil pattern 22 and the second planar coil pattern 24 are defined by the resin walls 25 and 26 provided on the insulating substrate 20. The resin walls 25 and 26 can be provided on the insulating substrate 20 after the first planar coil pattern 22 and the second planar coil pattern 24 are formed, and in this case, the resin walls 25 and 26 are provided in the first planar coil pattern 22 and the second planar coil pattern 24 by filling, coating, or the like. As will be described below, a space between the resin walls 25 and 26 between the first coil C1 and the second coil C2 is filled with a resist (resin part) 27. The resist 27 can be formed through the same process as the process of forming the resin walls 25 and 26. The resist 27 is formed of an insulating resin material and may be the same resin material as that of the resin walls 25 and 26.

The insulating substrate 20, together with the first coil C1 and the second coil C2, is integrally covered with a protective film 28. The protective film 28 covers an upper surface of the first planar coil pattern 22 and a lower surface of the second planar coil pattern 24, and fills a space between the first coil C1 and the second coil C2 on the insulating substrate 20. Specifically, the protective film 28 fills a space between the first planar coil pattern 22 of the first coil C1 and the first planar coil pattern 22 of the second coil C2 on the upper surface 20*a* of the insulating substrate 20, and fills a space between the second planar coil pattern 24 of the first coil C1 and the second planar coil pattern 24 of the second coil C2 on the lower surface 20*b* of the insulating substrate 20. The protective film 28 may be formed of a resin such as, for example, an epoxy resin or a polyimide resin and may be formed, for example, using a photolithography method.

The magnetic material 30 integrally covers the insulating substrate 20, the first coil C1, and the second coil C2. More specifically, the magnetic material 30 covers the insulating substrate 20, the first coil C1, and the second coil C2 from a vertical direction (thickness direction of the insulating substrate), and covers outer circumferences of the insulating substrate 20, the first coil C1, and the second coil C2. Also, the magnetic material 30 fills insides of the through holes 20*c* and 20*d* of the insulating substrate 20, and fills inner regions of the first coil C1 and the second coil C2. In the magnetic material 30, the magnetic material 30 of a portion filling the inside of the through hole 20*c* of the insulating substrate 20 and the inner region of the first coil C1 constitutes a magnetic core Z1 of the first coil C1, and the magnetic material 30 of a portion filling the inside of the through hole 20*d* of the insulating substrate 20 and the inner region of the second coil C2 constitutes a magnetic core Z2 of the second coil C2. In the present embodiment, the magnetic core Z1 of the first coil C1 and the magnetic core Z2 of the second coil C2 have a parallel relationship.

The magnetic material 30 is formed of a metal magnetic powder-containing resin. The metal magnetic powder-containing resin is a binder powder in which a metal magnetic powder is bound by a binder resin. The metal magnetic powder of the metal magnetic powder-containing resin constituting the magnetic material 30 may be formed of, for example, an iron-nickel alloy (a Permalloy alloy), carbonyl iron, an amorphous, non-crystalline, or crystalline FeSiCr-based alloy, Sendust, or the like. The binder resin may be, for example, a thermosetting epoxy resin. In the present embodiment, a content of the metal magnetic powder in the binder powder is 80 to 92% by volume percentage and 95 to 99% by mass percentage. From a viewpoint of magnetic characteristics, a content of the metal magnetic powder in the binder powder may also be 85 to 92% by volume percentage and 97 to 99% by mass percentage. A magnetic powder of the metal magnetic powder-containing resin constituting the magnetic material 30 may be a powder having an average particle diameter of one type, or may be a mixed powder having average particle diameters of a plurality of types. In the present embodiment, the magnetic powder of the metal magnetic powder-containing resin constituting the magnetic material 30 is a mixed powder having average particle diameters of three types. When the magnetic powder of the metal magnetic powder-containing resin constituting the magnetic material 30 is a mixed powder, types of the magnetic powder having different average particle sizes may be the same or different.

Figure 6:
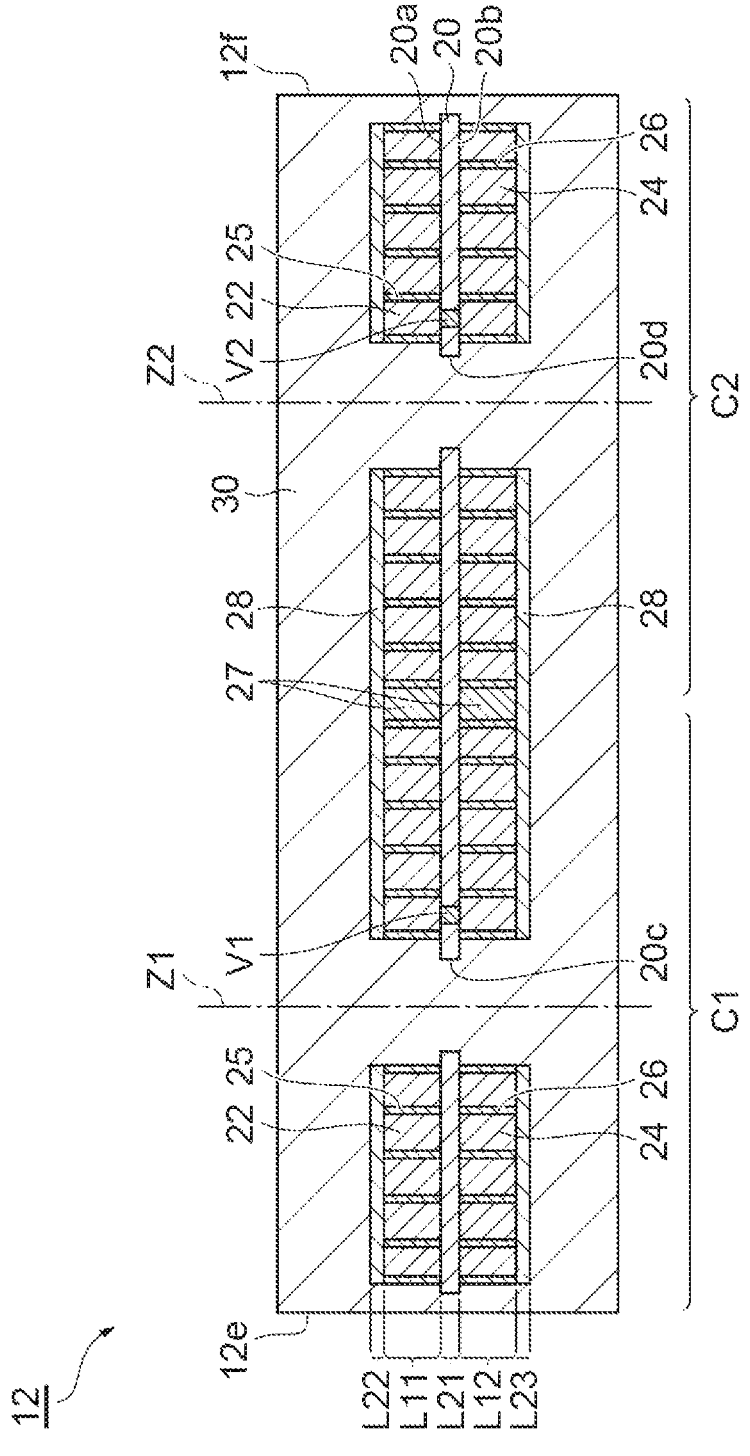
FIG. 6 is a cross-sectional view along line VI-VI of the main body part illustrated in FIG. 2.

The cross-sectional view of FIG. 6 illustrates a cross section including both the magnetic core Z1 of the first coil C1 and the magnetic core Z2 of the second coil C2. As illustrated in FIG. 6, the main body part 12 has a laminated structure including the insulating substrate 20, the planar coil patterns 22 and 24, and the protective film 28. In the present embodiment, the laminated structure of the main body part 12 is constituted by first layers L11 and L12 in which the planar coil patterns 22 and 24 are respectively positioned, and second layers L21 to L23 which directly overlap the first layers L11 and L12 and in which the insulating substrate 20 or the protective film 28 is positioned.

Figure 7:
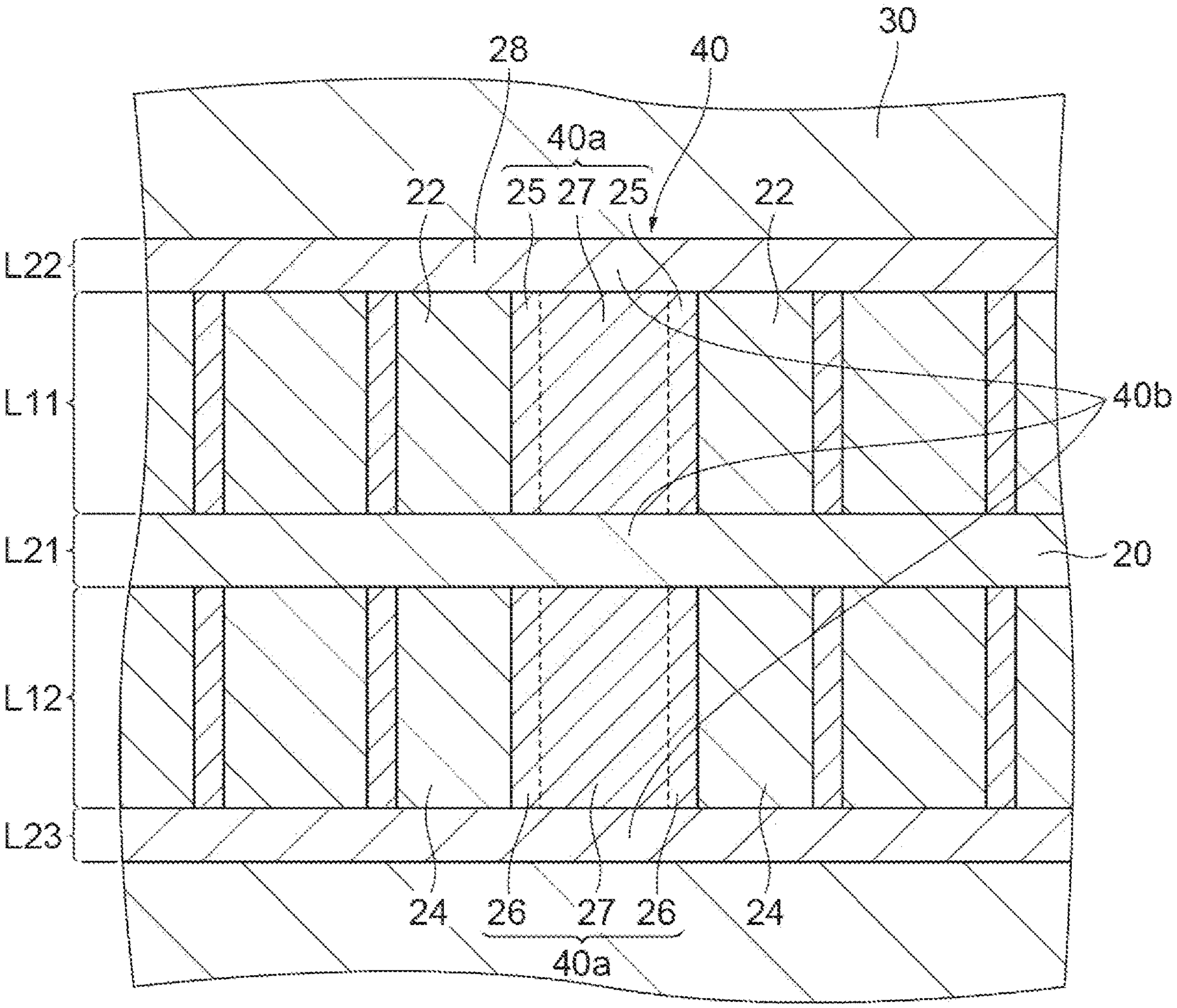
FIG. 7 is view in which a main part of the cross-sectional view of FIG. 6 is enlarged.

FIG. 7 is view in which a main part of the cross-sectional view of FIG. 6 is enlarged, and more specifically, is a view in which a portion between the first coil C1 and the second coil C2 in the main body part 12 is enlarged. As illustrated in FIG. 7, a non-magnetic part 40 is provided to be bridged between the first coil C1 and the second coil C2. In the present embodiment, the non-magnetic part 40 is constituted by the resin walls 25 and 26 and the resist 27 positioned in the first layers L11 and L12, a part of the insulating substrate 20 positioned in the second layer L21, and a part of the protective film 28 positioned in the second layers L22 and L23. As described above, the resin walls 25 and 26, the resist 27, the protective film 28, and the insulating substrate 20 are all formed of a non-magnetic material.

In the present embodiment, the resin walls 25 and 26 and the resist 27 form a resin part extending between the first coil C1 and the second coil C2 in the first layers L11 and L12, and the resin part constitutes a first portion 40*a* of the non-magnetic part 40. Also, in the present embodiment, a portion of the insulating substrate 20 connecting the first coil C1 and the second coil C2 constitutes a part of the second portion 40*b* of the non-magnetic part 40 positioned in the second layer L21 overlapping the first layers L11 and L12. Further, in the present embodiment, a portion of the protective film 28 connecting the first coil C1 and the second coil C2 constitutes a part of the second portion 40*b* of the non-magnetic part 40 positioned in the second layer L22 and L23 overlapping the first layers L11 and L12.

In the coil component 10 described above, the non-magnetic part 40 is stretched between the first coil C1 and the second coil C2 in the cross section of the element body illustrated in FIG. 6. Therefore, a magnetic flux in a direction along the magnetic core Z1 of the first coil C1 and the magnetic core Z2 of the second coil C2 is hindered or blocked by the non-magnetic part 40 between the first coil C1 and the second coil C2. Therefore, a magnetic flux of the first coil C1 and a magnetic flux of the second coil C2 are difficult to interfere with each other.

Figure 8:
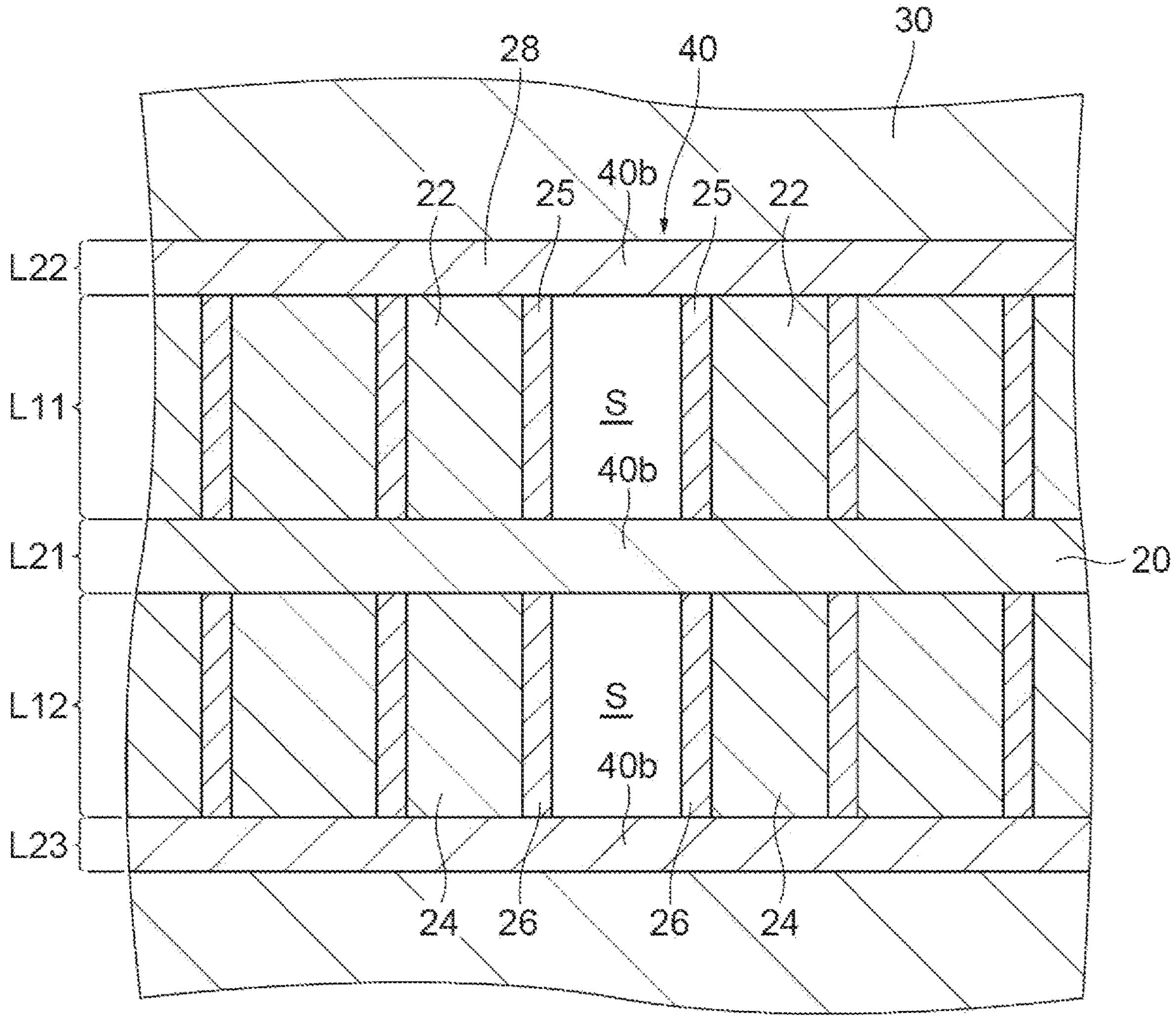
FIG. 8 is a view illustrating a coil component having a different form.

Further, the non-magnetic material constituting the non-magnetic part 40 can be appropriately replaced with a different non-magnetic material, and a part thereof can also be configured as a space (void). For example, as illustrated in FIG. 8, the non-magnetic part 40 may have a configuration in which there is a space S in the portion of the resist 27 described above.

Figure 9:
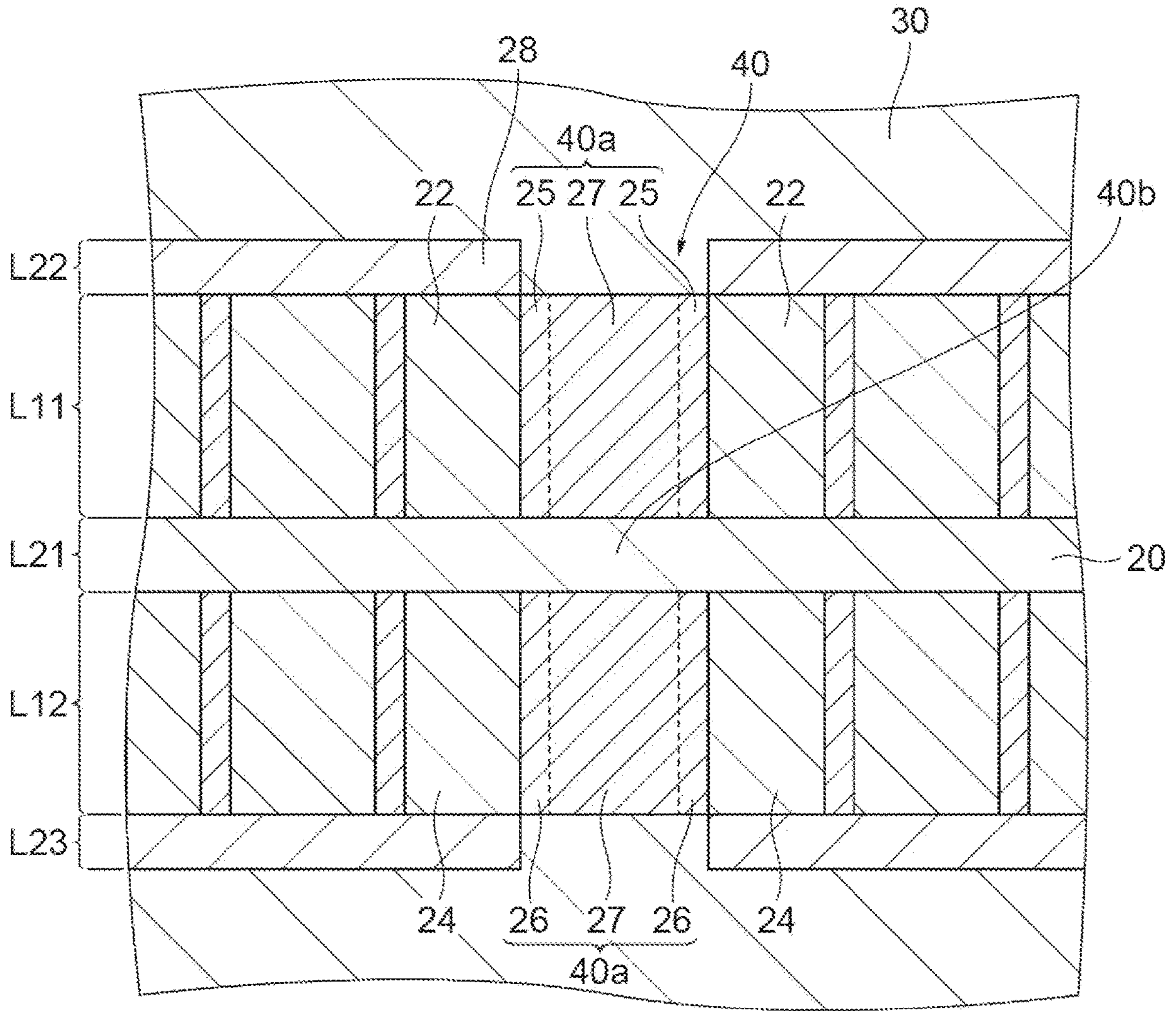
FIG. 9 is a view illustrating a coil component having a different form.
Figure 10:
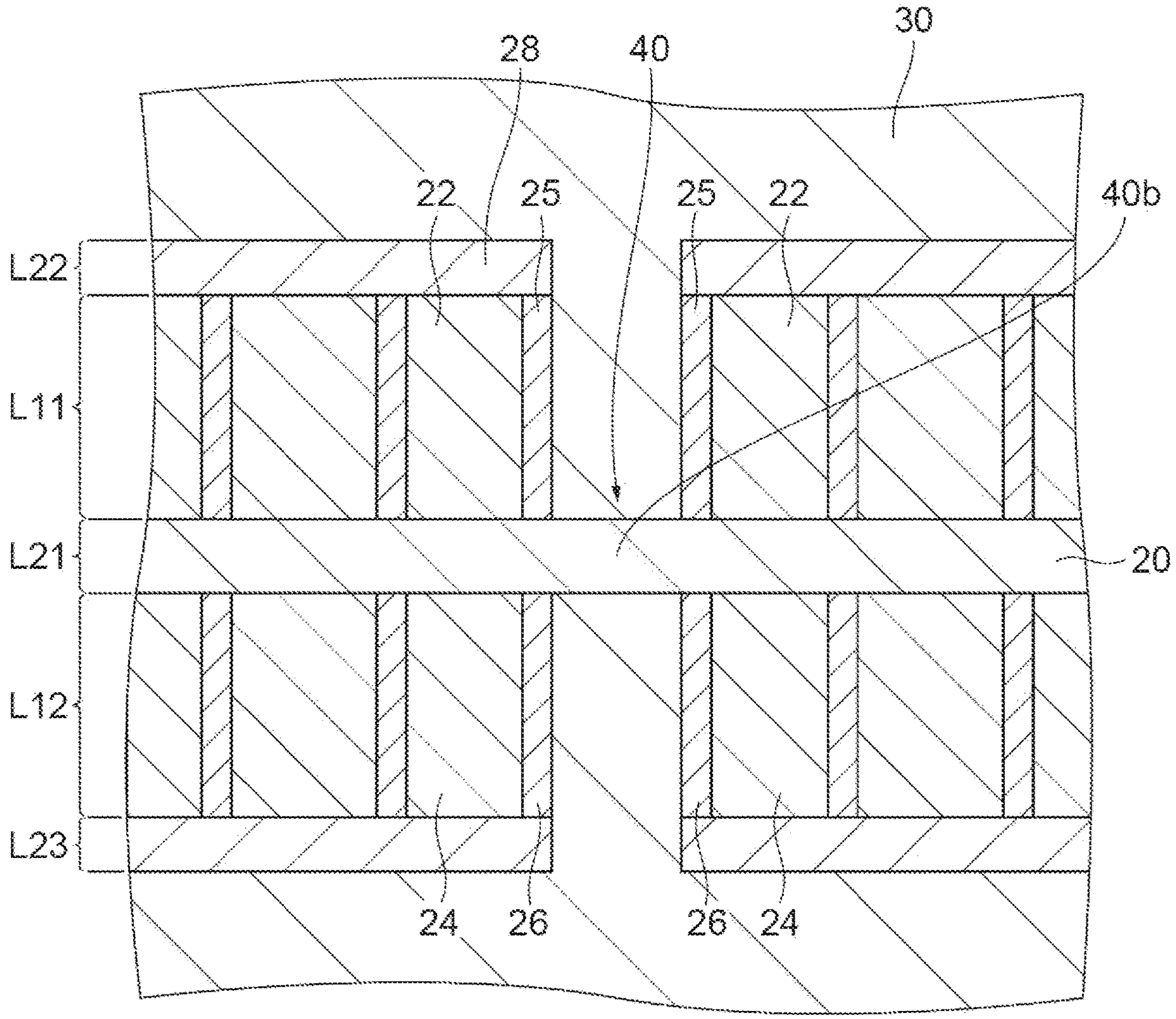
FIG. 10 is a view illustrating a coil component having a different form.

Also, the non-magnetic part 40 is not limited to the configuration in which the insulating material is present in all of the first layers L11 and L12 and the second layers L21 to L23 described above, and may also have a configuration in which the insulating material is present in a part (one layer or a plurality of layers) of the first layers L11 and L12 and the second layers L21 to L23. For example, as illustrated in FIG. 9, the non-magnetic part 40 may be constituted only by the resin walls 25 and 26 and the resist 27 positioned in the first layers L11 and L12 (that is, the first portion 40*a*), and a portion of the insulating substrate 20 connecting the first coil C1 and the second coil C2 positioned in the second layer L21 (that is, the second portion 40*b*), and the non-magnetic part 40 in this case does not include the protective film 28. Also, as illustrated in FIG. 10, the non-magnetic part 40 may be constituted only by a portion of the insulating substrate 20 connecting the first coil C1 and the second coil C2 positioned in the second layer L21 (that is, the second portion 40*b*), and the non-magnetic part 40 in this case does not include the resist 27 and the protective film 28. The disclosure may also have an aspect in which the magnetic material 30 is interposed between the first coil C1 and the second coil C2.

Further, the present disclosure is not limited to the above-described embodiments and may take various aspects.

For example, the coil component may have a configuration that does not include the insulating substrate. In this case, the first coil and the second coil may be constituted by a one-layer planar coil pattern. Both the first coil and the second coil need not be configured by a two-layer planar coil pattern (for example, a first planar coil pattern and a second planar coil pattern), and only one of them may be configured by a two-layer planar coil pattern. The two-layer planar coil pattern does not have to be line-symmetrical. Also, the number of turns of the first coil and the number of turns of the second coil can be increased or decreased as appropriate. The magnetic core of the first coil and the magnetic core of the second coil do not necessarily have to have a parallel relationship, and one magnetic core may be slightly inclined with respect to the other magnetic core.

What is claimed is:

1. A coil component comprising:

an element body;

a first coil (i) in the element body and (ii) wound only around a first magnetic core having a first longitudinal axis in a first direction;

a second coil (i) in the element body, (ii) wound only around a second magnetic core having a second longitudinal axis in the first direction that is parallel to and spaced from the first longitudinal axis and (iii) adjacent to the first coil in a second direction perpendicular to the first direction;

an insulating substrate (i) in the element body, (ii) comprising a non-magnetic insulating material, (iii) that is a flat plate oriented in the second direction, and (iv) that abuts the first coil and the second coil in the first direction; and a non-magnetic part (i) between the first coil and the second coil in the second direction and (ii) that overlaps the first magnetic core and the second magnetic core in the second direction, the non-magnetic part extends continuously from an end of the first coil nearest to the second coil to an end of the second coil nearest to the first coil along the second direction, the non-magnetic part including only one or more non-magnetic materials not including a magnetic material, wherein:

the first coil, the second coil and the non-magnetic part are configured such that an entirety of the first coil and an entirety of the second coil are physically separated by the non-magnetic part as the entirety of the first coil is on one side of the non-magnetic part and the entirety of the second coil is on another side of the non-magnetic part in the second direction, such that magnetic fluxes between the entirety of the first coil and the entirety of the second coil are suppressed by the non-magnetic part;

a first uppermost portion of the first coil and a second uppermost portion of the second coil are in an upper first layer of the element body and directly adjacent to a first surface of the insulating substrate in the first direction;

a first lowermost portion of the first coil and a second lowermost portion of the second coil are in a lower first layer of the element body and directly adjacent to a second surface of the insulating substrate in the first direction;

the first surface and the second surface are opposite surfaces of the insulating substrate, the non-magnetic part includes a pair of first portions in the upper first layer and the lower first layer, the non-magnetic part includes a second portion in a second layer of the element body, and the second portion in the second layer is sandwiched between the pair of first portions in the upper first layer and the lower first layer, the insulating substrate is at least a part of the second portion of the non-magnetic part, and the insulating substrate is composed of a non-magnetic material different from a material constituting the pair of first portions.

2. The coil component according to claim 1, wherein the pair of first portions are resin parts between the first coil and the second coil in the upper first layer and the lower first layer.

3. The coil component according to claim 1, further comprising:

a protective film that includes only one or more non-magnetic materials not including a magnetic material, the protective film integrally covering the insulating substrate along with the first coil and the second coil, wherein the non-magnetic part further includes a pair of additional second portions in additional second layers of the element body, which sandwich the upper first layer, the lower first layer, and the second layer, and wherein the protective film is at least a part of the additional second portions of the non-magnetic part.

4. The coil component according to claim 1, wherein the pair of first portions are each a void space between the first coil and the second coil in the upper first layer and the lower first layer.

5. The coil component according to claim 3, wherein the second portion and one of the pair of additional second portions sandwich the first portion in the upper first layer, and the second portion and the other one of the pair of additional second portions sandwich the first portion in the lower first layer.

6. The coil component according to claim 1, wherein a shortest distance between the first coil and the second coil in the second direction is a width of the non-magnetic part between the first coil and the second coil.

7. A coil component comprising:

an element body;

a first coil (i) in the element body and (ii) wound only around a first magnetic core having a first longitudinal axis in a first direction;

a second coil (i) in the element body, (ii) wound only around a second magnetic core having a second longitudinal axis in the first direction that is parallel to and spaced from the first longitudinal axis and (iii) adjacent to the first coil in a second direction perpendicular to the first direction;

an insulating substrate (i) in the element body, (ii) comprising a non-magnetic insulating material, (iii) that is a flat plate oriented in the second direction, and (iv) that abuts the first coil and the second coil in the first direction; and a non-magnetic part (i) between the first coil and the second coil in the second direction and (ii) that overlaps the first magnetic core and the second magnetic core in the second direction, wherein:

the first coil, the second coil and the non-magnetic part are configured such that an entirety of the first coil and an entirety of the second coil are physically separated by the non-magnetic part as the entirety of the first coil is on one side of the non-magnetic part and the entirety of the second coil is on another side of the non-magnetic part in the second direction, such that magnetic fluxes between the entirety of the first coil and the entirety of the second coil are suppressed by the non-magnetic part;

a first uppermost portion of the first coil and a second uppermost portion of the second coil are in an upper first layer of the element body and directly adjacent to a first surface of the insulating substrate in the first direction;

a first lowermost portion of the first coil and a second lowermost portion of the second coil are in a lower first layer of the element body and directly adjacent to a second surface of the insulating substrate in the first direction;

the first surface and the second surface are opposite surfaces of the insulating substrate, wherein the non-magnetic part includes a pair of first portions in the upper first layer and the lower first layer, the non-magnetic part includes a second portion in a second layer of the element body, and the second portion in the second layer is sandwiched between the pair of first portions in the upper first layer and the lower first layer, the insulating substrate is at least a part of the second portion of the non-magnetic part, and the insulating substrate is composed of a non-magnetic material different from a material constituting the pair of first portions, the coil component further comprises a protective film that includes only one or more non-magnetic materials and does not include a magnetic material, the protective film integrally covering the insulating substrate along with the first coil and the second coil, the non-magnetic part further includes a pair of additional second portions in additional second layers of the element body, which sandwich the upper first layer, the lower first layer, and the second layer, and the protective film is at least a part of the additional second portion of the non-magnetic part, and wherein the pair of first portions are each a void space between the first coil and the second coil in the upper first layer and the lower first layer.

* * * * *